United States Patent
Esseghir et al.

(10) Patent No.: US 9,663,645 B2
(45) Date of Patent: May 30, 2017

(54) OPTICAL FIBER CABLE COMPONENTS

(71) Applicant: Dow Global Technologies LLC, Midland, MI (US)

(72) Inventors: Mohamed Esseghir, Collegeville, PA (US); Gangwei Sun, Shanghai (CN); Bharat I. Chaudhary, Princeton, NJ (US); Chester J. Kmiec, Phillipsburg, NJ (US); Gary R. Marchand, Gonzales, LA (US); Yushan Hu, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/915,354

(22) PCT Filed: Oct. 18, 2013

(86) PCT No.: PCT/CN2013/085481
§ 371 (c)(1),
(2) Date: Feb. 29, 2016

(87) PCT Pub. No.: WO2015/054896
PCT Pub. Date: Apr. 23, 2015

(65) Prior Publication Data
US 2016/0215129 A1    Jul. 28, 2016

(51) Int. Cl.
C08L 23/12    (2006.01)
C08L 53/00    (2006.01)
G02B 6/44    (2006.01)

(52) U.S. Cl.
CPC .............. C08L 23/12 (2013.01); C08L 53/00 (2013.01); G02B 6/443 (2013.01); G02B 6/4429 (2013.01);
(Continued)

(58) Field of Classification Search
CPC ............ C08L 23/12; C08L 53/00; G02B 6/44
See application file for complete search history.

(56) References Cited

U.S. PATENT DOCUMENTS 5,138,683 A    8/1992    Oestreich et al.
5,574,816 A    11/1996    Yang et al.
(Continued)

FOREIGN PATENT DOCUMENTS

WO    2009/062131 A1    5/2009

OTHER PUBLICATIONS

Premphet, et al., "Polypropylene/metallocene ethylene-octene copolymer blends with a bimodal particle size distribution: Mechanical properties and their controlling factors"; Journal of Applied Polymer Science, vol. 85, Issue 11, May 30, 2001, pp. 2412-2418.

*Primary Examiner* — Robert Harlan

(57) ABSTRACT

Optical cable components fabricated from an extrudable polymeric blend of crystalline polypropylene modified with one or more impact-modifying polymers. The impact-modifying polymers are selected from an olefin multi-block interpolymer, an olefin block composite, and combinations thereof. Optionally, the polymeric blend can further comprise an elastomer other than the impact-modifying polymer. The polymeric blend may also contain one or more additives. The optical fiber cable components can be selected from buffer tubes, core tubes, and slotted core tubes.

10 Claims, 2 Drawing Sheets

(52) U.S. Cl.
CPC ....... *C08L 2201/08* (2013.01); *C08L 2203/12* (2013.01); *C08L 2205/06* (2013.01); *C08L 2205/24* (2013.01); *G02B 6/4407* (2013.01); *G02B 6/4479* (2013.01)

(56) References Cited

U.S. PATENT DOCUMENTS

| | | | |
|---|---|---|---|
| 5,911,023 | A | 6/1999 | Risch et al. |
| 6,041,153 | A | 3/2000 | Yang |
| 6,185,349 | B1 | 2/2001 | Dammert et al. |
| 6,215,931 | B1 | 4/2001 | Risch et al. |
| 6,411,403 | B1 | 6/2002 | Siddhamalli |
| 6,483,971 | B2 | 11/2002 | Gaillard et al. |
| 6,658,184 | B2 | 12/2003 | Bourget et al. |
| 6,707,973 | B2 | 3/2004 | Witt et al. |
| 6,915,052 | B2 | 7/2005 | Boogh |
| 6,992,226 | B2 | 1/2006 | Fischer et al. |
| 7,011,774 | B2 | 3/2006 | Risch |
| 7,466,887 | B2 | 12/2008 | Castellani et al. |
| 7,801,404 | B2 | 9/2010 | Pavan et al. |
| 7,947,793 | B2 | 5/2011 | Marchand et al. |
| 8,273,826 | B2 | 9/2012 | Walton et al. |
| 8,346,040 | B2 | 1/2013 | Testu et al. |
| 8,476,366 | B2 | 7/2013 | Walton et al. |
| 2005/0265673 | A1 | 12/2005 | Mumm et al. |
| 2006/0045439 | A1* | 3/2006 | Brown ................... G02B 6/443 385/100 |
| 2010/0016482 | A1 | 1/2010 | Heck et al. |
| 2010/0113698 | A1 | 5/2010 | Walton et al. |
| 2010/0122833 | A1 | 5/2010 | Han et al. |
| 2011/0082249 | A1 | 4/2011 | Shan et al. |
| 2011/0082257 | A1 | 4/2011 | Carnahan et al. |
| 2011/0313106 | A1 | 12/2011 | Shan et al. |
| 2011/0313107 | A1 | 12/2011 | Shan et al. |
| 2011/0313108 | A1 | 12/2011 | Shan et al. |
| 2012/0208946 | A1 | 8/2012 | Shan et al. |
| 2012/0208961 | A1 | 8/2012 | Carnahan et al. |
| 2015/0087787 | A1 | 3/2015 | Sutton et al. |

* cited by examiner

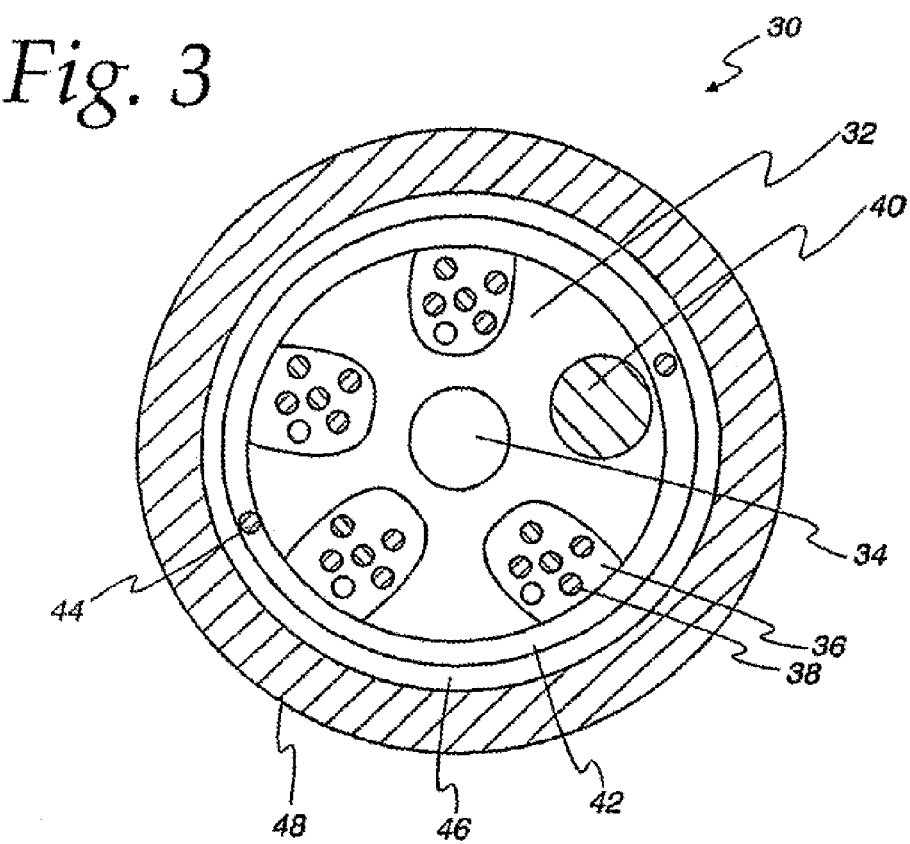

OPTICAL FIBER CABLE COMPONENTS

FIELD

Various embodiments of the present invention relate to buffer-tube, core-tube, or slotted-core fiber optic cable components made from an extrudable blend of crystalline polypropylene modified with one or more impact-modifying polymers.

INTRODUCTION

Optical fibers efficiently transmit information at high rates and over long distances. These fibers are delicate and need to be protected. In practical application, a fiber optic cable protects the fibers from mechanical damage and/or adverse environmental conditions such as moisture exposure. For example, specific protective components include extruded buffer tubes, core tubes, and slotted core members.

Buffer tubes, also known as loose buffer tubes, are protection components used to house and protect optical fibers, such as in a cable. Typically, these loose buffer tubes are filled with a hydrocarbon gel or grease to suspend and protect the fiber from moisture and have stringent requirements for high crush resistance, resistance to micro-bending, low brittleness temperature, good grease compatibility, impact resistance, and low post-extrusion shrinkage. Materials used in the manufacture of the buffer tubes include polybutylene terephthalate ("PBT"), high-crystallinity polypropylene, and to a lesser extent high-density polyethylene. PBT is a high-cost material, and cost-effective alternatives are desired.

SUMMARY

One embodiment is an extruded optical cable protective component comprising an extruded polymeric blend, said extruded polymeric blend comprising:
(a) a crystalline polypropylene having a crystallinity of at least about 55 percent; and
(b) an impact-modifying polymer selected from the group consisting of an olefin multi-block interpolymer, an olefin block composite, and combinations thereof.

BRIEF DESCRIPTION OF THE DRAWINGS

Reference is made to the accompanying drawings in which:

FIG. 3 shows a cross-sectional view of a slotted core optical fiber cable.

DETAILED DESCRIPTION

Figure 1:
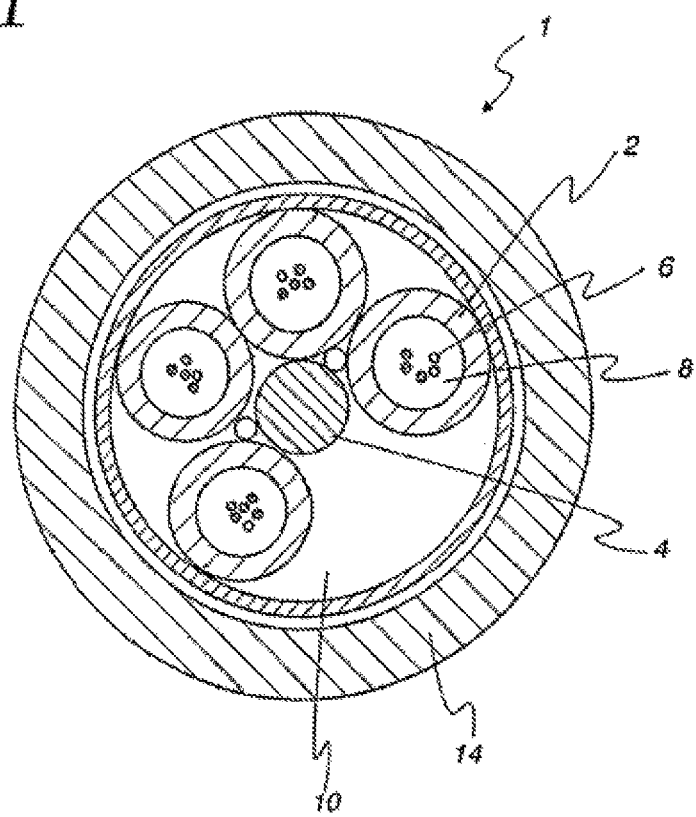
FIG. 1 shows a cross-sectional view of a loose buffer tube optical fiber cable.

Various embodiments of the present invention concern polymeric blends comprising a crystalline polypropylene with an impact-modifying polymer selected from the group consisting of an olefin multi-block interpolymer, an olefin block composite, and combinations thereof. Optionally, the polymeric blend can further comprise an elastomer other than the impact-modifying polymer. The polymeric blend may also contain one or more additives. Such polymeric blends can be extruded to form optical fiber cable protective components.

Crystalline Polypropylene

The crystalline polypropylene suitable for use in various embodiments can be either isotactic or syndiotactic homopolymer polypropylene. In one or more embodiments, the crystalline polypropylene can be an isotactic homopolymer polypropylene, in order to maximize the crystallinity of the polymer. "Polymer" means a macromolecular compound prepared by reacting (i.e., polymerizing) monomers of the same or different type. "Polymer" includes homopolymers and interpolymers. As used herein, "homopolymer" denotes a polymer comprising repeating units derived from a single monomer type, but does not exclude residual amounts of other components used in preparing the homopolymer, such as chain transfer agents.

The polypropylene used in the present invention is well known in the literature and can be prepared by known techniques. In general, the polypropylene can be made with Ziegler-Natta catalysts or metallocene catalysts. "Kirk-Othmer Encyclopedia of Chemical Technology" (2001) describes these catalysts and their corresponding reactor processes for making crystalline polypropylenes.

The crystallinity of the polypropylene is measured by differential scanning calorimetry ("DSC"). In this measurement, a small sample of the propylene polymer is sealed into an aluminum DSC pan. The sample is placed into a DSC cell with a 25-centimeter-per-minute nitrogen purge and cooled to about −100° C. A standard thermal history is established for the sample by heating at 10° C. per minute to 225° C. The sample then is re-cooled to about −100° C. and reheated at 10° C. per minute to 225° C. The observed heat of fusion ($\Delta H_{observed}$) for the second scan is recorded. The observed heat of fusion is related to the degree of crystallinity in weight percent based on the weight of the polypropylene sample by the following equation:

$$\text{Crystallinity percent} = (\Delta H_{observed})/(\Delta H_{isotactic\ pp}) \times 100$$

where the heat of fusion for isotactic polypropylene ($\Delta H_{isotactic\ pp}$) is reported in B. Wunderlich, Macromolecular Physics, Volume 3, Crystal Melting, Academic Press, New York, 1960, p 48, as 165 Joules per gram (J/g) of polymer. In various embodiments, the crystalline polypropylene can have a crystallinity of at least 55 weight percent, at least 65 weight percent, at least 70 weight percent, or at least 73 weight percent. U.S. Pat. No. 7,087,680, filed Oct. 7, 2003, discloses an example of a high crystalline polypropylene useful in various embodiments of the present invention.

In one or more embodiments, the crystalline polypropylene can have a melt index ($I_2$) ranging from 1 to 20 grams per 10 minutes ("g/10 min."), from 1 to 12 g/10 min., from 2 to 9 g/10 min., from 2 to 8 g/10 min., or from 3 to 6 g/10 min. Melt indices provided herein are determined according to ASTM method D1238. Unless otherwise noted, melt indices are determined at 190° C. and 2.16 Kg (i.e., $I_2$).

In various embodiments, the crystalline polypropylene can be present in the polymeric blend in an amount ranging from 50 to 95 weight percent ("wt %"), from 55 to 90 wt %, from 60 to 90 wt %, or from 70 to 90 wt % based on the total polymeric blend weight.

In various embodiments, a nucleating agent can be employed with the crystalline polypropylene. Examples of suitable nucleating agents include ADK NA-11 and ADK NA-21, which are available commercially from Asahi Denim Kokai. Other examples include the nucleating agents described in U.S. Pat. Nos. 3,367,926 and 5,574,816. Persons of ordinary skill in the art can readily identify other useful nucleating agents. The nucleating agents are typically incorporated into the crystalline polypropylene at levels of at least 500 ppm, at least 650 ppm, or at least 750 ppm.

Impact-Modifying Polymer

As noted above, the polymeric blend comprises an impact-modifying polymer selected from the group consisting of olefin multi-block interpolymers, olefin block composites, and combinations thereof. As used herein, an "impact-modifying polymer" is a polymer that modifies various properties of the above-described crystalline polypropylene. For example, the impact-modifying polymer can modify the crystalline polypropylene to enable it to absorb mechanical energy without fracture, thereby imparting sufficient impact toughness for fiber optic cable applications.

An "olefin multi-block interpolymer" is a polymer comprising two or more chemically distinct regions or segments (referred to as "blocks") preferably joined in a linear manner, that is, a polymer comprising chemically differentiated units which are joined end-to-end with respect to polymerized olefinic, preferable ethylenic, functionality, rather than in pendent or grafted fashion. In various embodiments, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the multi-block interpolymers used in the practice of this invention are characterized by unique distributions of both polymer polydispersity (PDI or Mw/Mn or MWD), block length distribution, and/or block number distribution, due, in a preferred embodiment, to the effect of the shuttling agent(s) in combination with multiple catalysts used in their preparation. More specifically, when produced in a continuous process, the polymers can have a PDI from 1.4 to 3.5, from 1.5 to 2.5, from 1.6 to 2.5, or from 1.6 to 2.1. When produced in a batch or semi-batch process, the polymers can have a PDI from 1.4 to 2.9, from 1.4 to 2.5, from 1.4 to 2.0, or from 1.4 to 1.8.

In various embodiments, the olefin multi-block interpolymer can be an ethylene multi-block interpolymer. The term "ethylene multi-block interpolymer" means a multi-block interpolymer comprising ethylene and one or more interpolymerizable comonomers, in which ethylene constitutes a plurality of the polymerized monomer units of at least one block or segment in the polymer, and can constitute at least 90, at least 95, or at least 98 mole percent ("mol %") of the block. Based on total polymer weight, the ethylene multi-block interpolymers used herein can have an ethylene content from 25 to 97 mol %, from 40 to 96 mol %, from 55 to 95 mol %, or from 65 to 85 mol %. The comonomer or comonomers can constitute the remainder of the interpolymer. In one or more embodiments, the olefin multi-block interpolymer can be an olefin multi-block copolymer.

In some embodiments, the ethylene multi-block interpolymer can be represented by the following formula:

(AB)$_n$ where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a linear fashion, not in a branched or a star fashion. "Hard" segments refer to blocks of polymerized units in which ethylene is present in an amount greater than 95 weight percent, and preferably greater than 98 weight percent. In other words, the comonomer content in the hard segments is less than 5 weight percent, and preferably less than 2 weight percent. In some embodiments, the hard segments comprise all or substantially all ethylene. "Soft" segments, on the other hand, refer to blocks of polymerized units of ethylene and an α-olefin comonomer in which the comonomer content is greater than 5 wt %, greater than 8 wt %, greater than 10 wt %, or greater than 15 wt %. In some embodiments, the comonomer content in the soft segments can be greater than 20 wt %, greater than 25 wt %, greater than 30 wt %, greater than 35 wt %, greater than 40 wt %, greater than 45 wt %, greater than 50 wt %, or greater than 60 wt %.

In some embodiments, A blocks and B blocks are randomly distributed along the polymer chain. In other words, the block interpolymers usually do not have a structure like:

AAA-AA-BBB-BB.

In other embodiments, the block interpolymers usually do not have a third type of block. In still other embodiments, each of block A and block B has monomers or comonomers randomly distributed within the block. In other words, neither block A nor block B comprises two or more segments (or sub-blocks) of distinct composition, such as a tip segment, which has a different composition than the rest of the block.

Because the respective distinguishable segments or blocks formed from two or more monomers are joined into single polymer chains, the polymer cannot be completely fractionated using standard selective extraction techniques. For example, polymers containing regions that are relatively crystalline (high density segments) and regions that are relatively amorphous (lower density segments) cannot be selectively extracted or fractionated using differing solvents. In various embodiments, the quantity of extractable polymer using either a dialkyl ether or an alkane-solvent is less than 10, less than 7, less than 5, or less than 2 percent of the total polymer weight.

In some embodiments, the multi-block interpolymers possess a PDI fitting a Schultz-Flory distribution rather than a Poisson distribution. The interpolymers are further characterized as having both a polydisperse block distribution and a polydisperse distribution of block sizes and possessing a most probable distribution of block lengths. Preferred multi-block interpolymers are those containing 4 or more blocks or segments including terminal blocks. More preferably, the interpolymers include at least 5, 10 or 20 blocks or segments including terminal blocks.

In a further embodiment, the olefin multi-block interpolymers of the invention, especially those made in a continuous, solution polymerization reactor, possess a most probable distribution of block lengths. In one embodiment of this invention, the olefin multi-block interpolymers are defined as having an Mw/Mn from about 1.7 to about 3.5, and:

(A) At least one melting point, $T_m$, in degrees Celsius, and a density, d, in grams/cubic centimeter, where in the numerical values of $T_m$ and d correspond to the relationship:

$$T_m > -6553.3 + 13735(d) - 7051.7(d)^2; \text{ or}$$

(B) Is characterized by a heat of fusion, ΔH in J/g, and a delta quantity, ΔT, in degrees Celsius defined as the temperature difference between the tallest differential scanning calorimetry ("DSC") peak and the tallest crystallization analysis fractionation ("CRYSTAF")

peak, wherein the numerical values of ΔT and ΔH have the following relationships:

$$\Delta T > -0.1299(\Delta H) + 62.81 \text{ for } \Delta H \text{ greater than zero and up to 130 J/g}$$

$$\Delta T > 48° \text{ C. for } \Delta H \text{ greater than 130 J/g}$$

wherein the CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C.; or (C) Elastic recovery, Re, in percent at 300 percent strain and 1 cycle measured with a compression-molded film of the olefin multi-block interpolymer, and has a density, d, in grams/cubic centimeter, wherein the numerical values of Re and d satisfy the following relationship when the olefin multi-block interpolymer is substantially free of crosslinked phase:

$$Re > 1481 - 1629(d); \text{ or}$$

(D) Has a molecular weight fraction which elutes between 40° C. and 130° C. when fractionated using temperature rising elution fractionation ("TREF"), characterized in that the fraction has a molar comonomer content of at least 5 percent higher, or at least 10 percent higher, than that of a comparable random ethylene interpolymer fraction eluting between the same temperatures, wherein the comparable random ethylene interpolymer has the same comonomer(s) and has a melt index, density and molar comonomer content (based on the whole polymer) within 10 percent of that of the olefin multi-block interpolymer; or (E) Has a storage modulus at 25° C., G'(25° C.), and a storage modulus at 100° C., G'(100° C.), wherein the ratio of G'(25° C.) to G'(100° C.) is in the range of about 1:1 to about 9:1; or (F) Is characterized by an average block index greater than zero and up to about 1.

The olefin multi-block interpolymer may have one, some, all, or any combination of properties (A)-(F).

Suitable monomers for use in preparing the olefin multi-block interpolymers used in the practice of this invention include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4 octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

The olefin multi-block interpolymer may be modified by, for example, grafting, hydrogenation, nitrene insertion reactions, or other functionalization reactions such as those known to those skilled in the art. Preferred functionalizations are grafting reactions using a free-radical mechanism. A variety of radically graftable species may be attached to the polymer, either individually, or as relatively short grafts. These species include unsaturated molecules, each containing at least one heteroatom. These species include, but are not limited to, maleic anhydride, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, and the respective esters, imides, salts, and Diels-Alder adducts of these compounds. These species also include silane compounds.

The olefin multi-block interpolymers can have a density of less than 0.90 g/cm$^3$, less than 0.89 g/cm$^3$, less than 0.885 g/cm$^3$, less than 0.88 g/cm$^3$, or less than 0.875 g/cm$^3$. The olefin multi-block interpolymers can have a density of at least 0.85 g/cm$^3$, at least 0.86, g/cm$^3$, or at least 0.865 g/cm$^3$. Density is measured by the procedure of ASTM D792.

The olefin multi-block interpolymers can have a melt index of at least 0.1 g/10 min., at least 0.2 g/10 min., or at least 0.3 g/10 min. In various embodiments, the olefin multi-block interpolymers can have a melt index of less than 20 g/10 min., less than 10 g/10 min., less than 7 g/10 min., or less than 1 g/10 min. In one or more embodiments, the olefin multi-block interpolymer can have a melt index ranging from 0.38 to 0.62 g/10 min.

The olefin multi-block interpolymers useful herein can have a 2% secant flexural modulus of less than 150 MPa, less than 100 MPa, less than 50 MPa, or less than 10 MPa, as measured according to ASTM method D790. The olefin multi-block interpolymers can have a 2% secant modulus of greater than zero.

The olefin multi-block interpolymers useful herein can have a melting point of less than 125° C., but greater than 60° C., greater than 70° C., greater than 80° C., greater than 90° C., greater than 100° C., or greater than 110° C. Melting point is measured by the differential scanning calorimetry ("DSC") method described in WO 2005/090427 (US2006/0199930).

The olefin multi-block interpolymers can have a weight-average molecular weight ("Mw") from 1,000 to 5,000,000 g/mol, from 1,000 to 1,000,000 g/mol, from 10,000 to 500,000 g/mol, or from 10,000 to 300,000 g/mol.

In one or more embodiments, the olefin multi-block interpolymer contains 10 to 40 wt %, 15 to 25 wt %, or 15 to 17 wt % of a hard segment. The hard segment is free of or contains less than 0.5 mol % units derived from comonomer. The olefin multi-block interpolymer also contains 60 to 90 wt %, or 75 to 85 wt %, or 83 wt % to 85 wt % of a soft segment. The content of alpha olefin in the soft block may range from 20 to 40 mol %, from 25 to 35 mol %, or from 23 to 30 mol %. In various embodiments the comonomer is butene or octene. In some embodiments, the comonomer is octene. Comonomer content is measured by nuclear magnetic resonance ("NMR") spectroscopy.

In various embodiments, the olefin multi-block interpolymer can be mesophase separated. As used herein, "mesophase separation" means a process in which polymeric blocks are locally segregated to form ordered domains. Crystallization of the ethylene segments in these systems is primarily constrained to the resulting mesodomains and such systems may be referred to as "mesophase separated." These mesodomains can take the form of spheres, cylinders, lamellae, or other morphologies known for block interpolymers. The narrowest dimension of a domain, such as perpendicular to the plane of lamellae, is generally greater than about 40 nm in the mesophase-separated olefin multi-block interpolymers of the present invention.

Domain sizes can be in the range of from 40 to 300 nm, from 50 to 250 nm, or from 60 to 200 nm, as measured by the smallest dimension such as perpendicular to the plane of lamellae or the diameter of spheres or cylinders. In addition, domains may have smallest dimensions that are greater than 60 nm, greater than 100 nm, and greater than 150 nm. Domains may be characterized as cylinders, spheres, lamellae, or other morphologies known for block interpolymers.

The mesophase-separated polymers comprise olefin block interpolymers wherein the amount of comonomer in the soft segments as compared to that in the hard segments is such that the block interpolymer undergoes mesophase separation in the melt. The required amount of comonomer may be measured in mole percent and varies with each comonomer. A calculation may be made for any desired comonomer in order to determine the amount required to achieve mesophase separation. The minimum level of incompatibility, expressed as $\chi N$, to achieve mesophase separation in these polydisperse block interpolymers is predicted to be $\chi N=2.0$ (I. I. Potemkin, S. V. Panyukov, *Phys. Rev. E.* 57, 6902 (1998)). Recognizing that fluctuations usually push the order-disorder transition in commercial block copolymers to slightly higher $\chi N$, a value $\chi N=2.34$ has been used as the minimum in the calculations below. Following the approach of D. J. Lohse, W. W. Graessley, *Polymer Blends Volume 1: Formulation*, ed. D. R. Paul, C. B. Bucknall, 2000, $\chi N$ can be converted to the product of $\chi/v$ and $M/\rho$ where v is a reference volume, M is the number average block molecular weight and $\rho$ is the melt density. The melt density is taken to be 0.78 g/cm$^3$ and a typical value of block molecular weight is approximately 25,500 g/mol based on a diblock at an overall molecular weight of 51,000 g/mol. $\chi/v$ for cases in which the comonomer is butene or propylene is determined using 130° C. as the temperature and then performing an interpolation or extrapolation of the data provided in Table 8.1 in the reference by Lohse and Graessley. For each comonomer type, a linear regression in mole percent comonomer was performed. For cases in which octene is the comonomer, the same procedure was performed with the data of Reichart, G. C. et al, *Macromolecules* (1998), 31, 7886. The entanglement molecular weight at 413 K (about 140° C.) in kg/mol is taken to be 1.1. Using these parameters, the minimum difference in comonomer content is determined to be, respectively, 20.0, 30.8 or 40.7 mole percent when the comonomer is octene, butene, or propylene. When the comonomer is 1-octene, the difference in mole percent octene between the hard segment and the soft segment (Δ octene) can be at least 20.0 mol %, at least 22 mol %, at least 23 mol %, at least 24 mol %, at least 25 mol %, or at least 26 mol %. In addition, the Δ octene value may be in the range of from 20.0 to 60 mol %, or from 22 to 45 mol %. When the comonomer is 1-butene, the difference in mole percent butene between the hard segment and the soft segment (Δ butene) can be at least 30.8 mol %, at least 33.9 mol %, at least 35.4 mol %, at least 36.9 mol %, at least 38.5 mol %, or at least 40.0 mol %. In addition, the Δ butene value may be in the range of from 30.8 to 80 mol %, from 33.9 to 60 mol %, from 36 to 50 mol %, or from 37 to 40 mol %. When the comonomer is propylene, the difference in mole percent propylene between the hard segment and the soft segment (Δ propylene) is at least 40.7 mol %, at least 44.7 mol %, at least 46.8 mol %, at least 48.8 mol %, at least 50.9 mol %, or at least 52.9 mol %. In addition, the Δ propylene value may be in the range of from 40.7 to 95 mol %, from 44.7 to 65 mol %, or from 48.8 to 60 mol %.

In some embodiments, the olefin multi-block interpolymer can have an average block index ("ABI") greater than zero but less than 0.4 or from 0.1 to 0.3. In other embodiments, ABI can be greater than 0.4 and up to 1.0. In some embodiments, ABI can be in the range of from 0.4 to 0.7, from 0.5 to 0.7, or from 0.6 to 0.9. In yet other embodiments, ABI can be in the range of from 0.3 to 0.9, from 0.3 to 0.8, or from 0.3 to 0.7, from 0.3 to 0.6, from 0.3 to 0.5, or from 0.3 to 0.4. In still other embodiments, ABI can be in the range of from 0.4 to 1.0, from 0.5 to 1.0, from 0.6 to 1.0, from 0.7 to 1.0, from 0.8 to 1.0, or from 0.9 to 1.0.

The olefin multi-block interpolymers used in the practice of this invention, their preparation and use, as well as methods for calculating certain properties (such as ABI) are more fully described in U.S. Pat. No. 7,947,793 and U.S. Patent Application Publication No. 2010/0113698 A1.

An example of a commercially available olefin multi-block interpolymer suitable for use herein includes, but is not limited to, INFUSE™ 9077, available from The Dow Chemical Company, Midland, Mich., USA.

As noted above, the polymeric blends of the present application can comprise an olefin block composite. The term "block composite" refers to polymer compositions comprising three components: (1) a soft copolymer, (2) a hard polymer, and (3) a block copolymer having a soft segment and a hard segment. The hard segment of the block copolymer is the same composition as the hard polymer in the block composite and the soft segment of the block copolymer is the same composition as the soft copolymer of the block composite.

The block copolymers present in the olefin block composite can be linear or branched. More specifically, when produced in a continuous process, the block composites can have a PDI from 1.7 to 15, from 1.8 to 3.5, from 1.8 to 2.2, or from 1.8 to 2.1. When produced in a batch or semi-batch process, the block composites can have a PDI from 1.0 to 2.9, from 1.3 to 2.5, from 1.4 to 2.0, or from 1.4 to 1.8. The term "olefin block composite" refers to block composites prepared solely or substantially solely from two or more α-olefin types of monomers. In various embodiments, the olefin block composite can consist of only two α-olefin type monomer units. An example of an olefin block composite would be a hard segment and hard polymer comprising only or substantially only propylene monomer residues with a soft segment and soft polymer comprising only or substantially only ethylene and propylene comonomer residues.

In describing olefin block composites, "hard" segments refer to highly crystalline blocks of polymerized units in which a single monomer is present in an amount greater than 95 mol %, or greater than 98 mol %. In other words, the comonomer content in the hard segments is less than 5 mol %, or less than 2 mol %. In some embodiments, the hard segments comprise all or substantially all propylene units. "Soft" segments, on the other hand, refer to amorphous, substantially amorphous or elastomeric blocks of polymerized units having a comonomer content greater than 10 mol %. In some embodiments, the soft segments comprise ethylene/propylene interpolymers.

When referring to block composites, the term "polyethylene" includes homopolymers of ethylene and copolymers of ethylene and one or more $C_{3-8}$ α-olefins in which ethylene comprises at least 50 mole percent. The term "propylene copolymer" or "propylene interpolymer" means a copolymer comprising propylene and one or more copolymerizable comonomers, where a plurality of the polymerized monomer units of at least one block or segment in the polymer (the crystalline block) comprises propylene, which can be present in an amount of at least 90 mole percent, at least 95 mole percent, or at least 98 mole percent. A polymer made primarily from a different α-olefin, such as 4-methyl-1-pentene would be named similarly. The term "crystalline," when used to describe olefin block composites, refers to a polymer or polymer block that possesses a first order transition or crystalline melting point ("Tm") as determined by differential scanning calorimetry ("DSC") or equivalent technique. The term "crystalline" may be used interchangeably with the term "semicrystalline." The term "amorphous" refers to a polymer lacking a crystalline melting point. The term, "isotactic" denotes polymer repeat units having at least 70 percent isotactic pentads as determined by $^{13}$C-nuclear magnetic resonance ("NMR") analysis. "Highly isotactic" denotes polymers having at least 90 percent isotactic pentads.

When referring to olefin block composites, the term "block copolymer" or "segmented copolymer" refers to a polymer comprising two or more chemically distinct regions or segments (referred to as "blocks") joined in a linear manner, that is, a polymer comprising chemically differentiated units which are joined end-to-end with respect to polymerized ethylenic functionality, rather than in pendent or grafted fashion. In an embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The olefin block composites employed herein are characterized by unique distributions of polymer PDI, block length distribution, and/or block number distribution, due, in a preferred embodiment, to the effect of shuttling agent(s) in combination with the catalyst(s) used in preparing the block composites.

The olefin block composite employed herein can be prepared by a process comprising contacting an addition polymerizable monomer or mixture of monomers under addition polymerization conditions with a composition comprising at least one addition polymerization catalyst, a cocatalyst and a chain shuttling agent ("CSA"), the process being characterized by formation of at least some of the growing polymer chains under differentiated process conditions in two or more reactors operating under steady state polymerization conditions or in two or more zones of a reactor operating under plug flow polymerization conditions.

Suitable monomers for use in preparing the olefin block composites of the present invention include any addition polymerizable monomer, such as any olefin or diolefin monomer, including any α-olefin. Examples of suitable monomers include straight-chain or branched α-olefins of 2 to 30, or 2 to 20, carbon atoms, such as ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; and di- and poly-olefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene, dicyclopentadiene, 7-methyl-1,6-octadiene, 4-ethylidene-8-methyl-1,7-nonadiene, and 5,9-dimethyl-1,4,8-decatriene. In various embodiments, ethylene and at least one copolymerizable comonomer, propylene and at least one copolymerizable comonomer having from 4 to 20 carbons, 1-butene and at least one copolymerizable comonomer having 2 or from 5 to 20 carbons, or 4-methyl-1-pentene and at least one different copolymerizable comonomer having from 4 to 20 carbons can be employed. In an embodiment, the olefin block composites are prepared using propylene and ethylene monomers.

Comonomer content in the resulting block composites may be measured using any suitable technique, such as NMR spectroscopy. It is highly desirable that some or all of the polymer blocks comprise amorphous or relatively amorphous polymers such as copolymers of propylene, 1-butene, or 4-methyl-1-pentene and a comonomer, especially random copolymers of propylene, 1-butene, or 4-methyl-1-pentene with ethylene, and any remaining polymer blocks (hard segments), if any, predominantly comprise propylene, 1-butene or 4-methyl-1-pentene in polymerized form. Preferably such hard segments are highly crystalline or stereospecific polypropylene, polybutene or poly-4-methyl-1-pentene, especially isotactic homopolymers.

Further, the block copolymers of the block composites comprise from 10 to 90 wt % hard segments and 90 to 10 wt % soft segments.

Within the soft segments, the mole percent comonomer may range from 5 to 90 wt %, or from 10 to 60 wt %. In the case where the comonomer is ethylene, it can be present in an amount from 10 to 75 wt %, or from 30 to 70 wt %. In an embodiment, propylene constitutes the remainder of the soft segment.

In an embodiment, the block copolymers of the olefin block composites comprise hard segments that are 80 to 100 wt % propylene. The hard segments can be greater than 90 wt %, 95 wt %, or 98 wt % propylene.

The block composites described herein may be differentiated from conventional, random copolymers, physical blends of polymers, and block copolymers prepared via sequential monomer addition. The block composites may be differentiated from random copolymers by characteristics such as higher melting temperatures for a comparable amount of comonomer, block composite index, as described below; from a physical blend by characteristics such as block composite index, better tensile strength, improved fracture strength, finer morphology, improved optics, and greater impact strength at lower temperature; from block copolymers prepared by sequential monomer addition by molecular weight distribution, rheology, shear thinning, rheology ratio, and in that there is block polydispersity.

In some embodiments, the block composites have a Block Composite Index ("BCI"), as defined below, that is greater than zero but less than 0.4, or from 0.1 to 0.3. In other embodiments, BCI is greater than 0.4 and up to 1.0. Additionally, the BCI can range from 0.4 to 0.7, from 0.5 to 0.7, or from 0.6 to 0.9. In some embodiments, BCI ranges from 0.3 to 0.9, from 0.3 to 0.8, from 0.3 to 0.7, from 0.3 to 0.6, from 0.3 to 0.5, or from 0.3 to 0.4. In other embodiments, BCI ranges from 0.4 to 1.0, from 0.5 to 1.0, from 0.6 to 1.0, from 0.7 to 1.0, from 0.8 to 1.0, or from 0.9 to 1.0. BCI is herein defined to equal the weight percentage of diblock copolymer divided by 100% (i.e., weight fraction). The value of the block composite index can range from 0 to 1, wherein 1 would be equal to 100% diblock and zero would be for a material such as a traditional blend or random copolymer. Methods for determining BCI can be found, for example, in U.S. Published Patent Application No. 2011/0082258 from paragraph [0170] to [0189].

The olefin block composites can have a Tm greater than 100° C., preferably greater than 120° C., and more preferably greater than 125° C. The melt index ("$I_2$") of the block composite can range from 0.1 to 1000 g/10 min., from 0.1 to 50 g/10 min., from 0.1 to 30 g/10 min., or from 1 to 10 g/10 min. The block composites can have a weight average molecular weight ("Mw") from 10,000 to 2,500,000, from 35,000 to 1,000,000, from 50,000 to 300,000, or from 50,000 to 200,000 g/mol.

Processes useful in producing the olefin block composites suitable for use in the present invention may be found, for example, in U.S. Patent Application Publication No. 2008/0269412, published on Oct. 30, 2008. Suitable catalysts and catalyst precursors for use in the present invention include metal complexes such as disclosed in WO 2005/090426, in particular, those disclosed starting on page 20, line 30 through page 53, line 20. Suitable catalysts are also disclosed in U.S. 2006/0199930; U.S. 2007/0167578; U.S. 2008/0311812; U.S. 2011/0082258; U.S. Pat. No. 7,355,089; and WO 2009/012215. Suitable co-catalysts are those disclosed in WO 2005/090426, in particular, those disclosed on page 54, line 1 to page 60, line 12. Suitable chain shuttling agents are those disclosed in WO 2005/090426, in particular, those disclosed on page 19, line 21 through page 20 line 12. Particularly preferred chain shuttling agents are dialkyl zinc compounds. The olefin block composites themselves are more fully described in U.S. Pat. No. 8,476,366.

In various embodiments, the polymeric blend can comprise a combination of olefin multi-block interpolymers and olefin block composites as the impact-modifying polymer. When both are present, the olefin multi-block interpolymers and olefin block composites can be present in a weight ratio ranging from 99:1 to 1:99, from 10:1 to 1:10, or from 4:1 to 1:4 based on the combined weight of the olefin multi-block interpolymer and the olefin block composite.

In one or more embodiments, the impact-modifying polymer can be present in the polymeric composition in an amount ranging from 4 to 50 wt %, from 5 to 45 wt %, from 10 to 40 wt %, from 10 to 30 wt %, from 20 to 40 wt %, or from 25 to 35 wt %, based on the entire polymeric blend weight.

Elastomer

As noted above, an elastomer other than the above-described impact-modifying polymer can be employed in the polymeric blend. The optional elastomer, if present, can be used in amounts ranging from 4 to 50 wt %, from 7 to 40 wt %, or from 10 to 30 wt % based on the entire weight of the composition.

In various embodiments, the optional elastomer can be an olefin elastomer. Olefin elastomers include both polyolefin homopolymers and interpolymers. These olefin elastomers specifically exclude olefin multi-block interpolymer elastomers and olefin block composite elastomers. Examples of polyolefin homopolymers are homopolymers of ethylene and propylene. Examples of the polyolefin interpolymers are ethylene/α-olefin interpolymers and propylene/α-olefin interpolymers. In such embodiments, the α-olefin can be a $C_{3-20}$ linear, branched or cyclic α-olefin (for the propylene/α-olefin interpolymers, ethylene is considered an α-olefin). Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the α-olefins described above. Similarly, styrene and its related olefins (for example, α-methylstyrene, etc.) are α-olefins for purposes of this invention. Illustrative polyolefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random or blocky, but they are not olefin multi-block copolymers or olefin block composites, as described above.

Olefin elastomers can also comprise one or more functional groups such as an unsaturated ester or acid or silane, and these elastomers (polyolefins) are well known and can be prepared by conventional high-pressure techniques. The unsaturated esters can be alkyl acrylates, alkyl methacrylates, or vinyl carboxylates. The alkyl groups can have 1 to 8 carbon atoms and preferably have 1 to 4 carbon atoms. The carboxylate groups can have 2 to 8 carbon atoms and preferably have 2 to 5 carbon atoms. The portion of the copolymer attributed to the ester comonomer can be in the range of 1 up to 50 percent by weight based on the weight of the copolymer. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. Examples of the unsaturated acids include acrylic acids or maleic acids. One example of an unsaturated silane is vinyl trialkoxysilane.

Functional groups can also be included in the olefin elastomer through grafting which can be accomplished as is commonly known in the art. In one embodiment, grafting may occur by way of free radical functionalization which typically includes melt blending an olefin polymer, a free radical initiator (such as a peroxide or the like), and a compound containing a functional group. During melt blending, the free radical initiator reacts (reactive melt blending) with the olefin polymer to form polymer radicals. The compound containing a functional group bonds to the backbone of the polymer radicals to form a functionalized polymer. Exemplary compounds containing functional groups include but are not limited to alkoxysilanes, e.g., vinyl trimethoxysilane, vinyl triethoxysilane, and vinyl carboxylic acids and anhydrides, e.g., maleic anhydride.

More specific examples of the optional olefin elastomers useful in this invention include very-low-density polyethylene ("VLDPE") (e.g., FLEXOMER™ ethylene/1-hexene polyethylene made by The Dow Chemical Company), homogeneously branched, linear ethylene/α-olefin copolymers (e.g. TAFMER™ by Mitsui Petrochemicals Company Limited and EXACT™ by Exxon Chemical Company), and homogeneously branched, substantially linear ethylene/α-olefin polymers (e.g., AFFINITY™ and ENGAGE™ polyethylene available from The Dow Chemical Company). The more preferred polyolefin copolymers are the homogeneously branched linear and substantially linear ethylene copolymers. The substantially linear ethylene copolymers are especially preferred, and are more fully described in U.S. Pat. Nos. 5,272,236, 5,278,272 and 5,986,028.

The olefin elastomers useful herein also include propylene, butene, and other alkene-based copolymers, e.g., copolymers comprising a majority of units derived from propylene and a minority of units derived from another α-olefin (including ethylene). Exemplary propylene polymers useful herein include VERSIFY™ polymers available from The Dow Chemical Company, and VISTAMAXX™ polymers available from ExxonMobil Chemical Company.

Olefin elastomers can also include ethylene-propylene-diene monomer ("EPDM") elastomers and chlorinated polyethylenes ("CPE"). Commercial examples of suitable EPDMs include NORDEL™ EPDMs, available from The Dow Chemical Company. Commercial examples of suitable CPEs include TYRIN™ CPEs, available from The Dow Chemical Company.

Olefin elastomers, particularly ethylene elastomers, can have, before grafting, a density of less than 0.91 g/cm$^3$ or less than 0.90 g/cm$^3$. Ethylene copolymers typically have a density greater than 0.85 g/cm$^3$ or greater than 0.86, g/cm$^3$.

Ethylene elastomers can have, before grafting, a melt index ($I_2$) greater than 0.10 g/10 min., or greater than 1 g/10 min. Ethylene elastomers can have a melt index of less than 500 g/10 min. or less than 100 g/10 min.

In various embodiments, the optional elastomer can be a non-olefin elastomer. Non-olefin elastomers useful herein include silicone and urethane elastomers, styrene-butadiene rubber ("SBR"), nitrile rubber, chloroprene, fluoroelastomers, perfluoroelastomers, polyether block amides and chlorosulfonated polyethylene. Silicone elastomers are polyorganosiloxanes typically having an average unit formula $R_aSiO_{(4-a)/2}$ which may have a linear or partially-branched structure, but is preferably linear. Each R may be the same or different. R is a substituted or non-substituted monovalent hydrocarbon group which may be, for example, an alkyl group, such as methyl, ethyl, propyl, butyl, and octyl groups; aryl groups such as phenyl and tolyl groups; aralkyl groups; alkenyl groups, for example, vinyl, allyl, butenyl, hexenyl, and heptenyl groups; and halogenated alkyl groups, for example chloropropyl and 3,3,3-trifluoropropyl groups. The polyorganosiloxane may be terminated by any of the above groups or with hydroxyl groups. When R is an alkenyl group the alkenyl group is preferably a vinyl group or hexenyl group. Indeed alkenyl groups may be present in the polyorganosiloxane on terminal groups and/or polymer side chains.

Representative silicone rubbers or polyorganosiloxanes include, but are not limited to, dimethylvinylsiloxy-terminated polydimethylsiloxane, trimethylsiloxy-terminated polydimethylsiloxane, trimethylsiloxy-terminated copolymer of methylvinylsiloxane and dimethylsiloxane, dimethylvinylsiloxy-terminated copolymer of methylvinylsiloxane and dimethylsiloxane, dimethylhydroxysiloxy-terminated polydimethylsiloxane, dimethylhydroxysiloxy-terminated copolymer of methylvinylsiloxane and dimethylsiloxane, methylvinylhydroxysiloxy-terminated copolymer of methylvinylsiloxane and dimethylsiloxane, dimethylhexenylsiloxy-terminated polydimethylsiloxane, trimethylsiloxy-terminated copolymer of methylhexenylsiloxane and dimethylsiloxane, dimethylhexenylsiloxy-terminated copolymer of methylhexenylsiloxane and dimethylsiloxane, dimethylvinylsiloxy-terminated copolymer of methylphenylsiloxane and dimethylsiloxane, dimethylhexenylsiloxy-terminated copolymer of methylphenylsiloxane and dimethylsiloxane, dimethylvinylsiloxy-terminated copolymer of methyl(3,3,3-trifluoropropyl)siloxane and dimethylsiloxane, and dimethylhexenylsiloxy-terminated copolymer of methyl(3,3,3-trifluoropropyl)siloxane and dimethylsiloxane.

Urethane elastomers are prepared from reactive polymers such as polyethers and polyesters and isocyanate functional organic compounds. One typical example is the reaction product of a dihydroxy functional polyether and/or a trihydroxy functional polyether with toluene diisocyanate such that all of the hydroxy is reacted to form urethane linkages leaving isocyanate groups for further reaction. This type of reaction product is termed a prepolymer which may cure by itself on exposure to moisture or by the stoichiometric addition of polycarbinols or other polyfunctional reactive materials which react with isocyanates. The urethane elastomers are commercially prepared having various ratios of isocyanate compounds and polyethers or polyesters.

The most common urethane elastomers are those containing hydroxyl functional polyethers or polyesters and low molecular weight polyfunctional, polymeric isocyanates. Another common material for use with hydroxyl functional polyethers and polyesters is toluene diisocyanate.

Nonlimiting examples of suitable urethane rubbers include the PELLETHANE™ thermoplastic polyurethane elastomers available from the Lubrizol Corporation; ESTANE™ thermoplastic polyurethanes, TECOFLEX™ thermoplastic polyurethanes, CARBOTHANE™ thermoplastic polyurethanes, TECOPHILIC™ thermoplastic polyurethanes, TECOPLAST™ thermoplastic polyurethanes, and TECOTHANE™ thermoplastic polyurethanes, all available from Noveon; ELASTOLLAN™ thermoplastic polyurethanes and other thermoplastic polyurethanes available from BASF; and additional thermoplastic polyurethane materials available from Bayer, Huntsman, Lubrizol Corporation, Merquinsa and other suppliers. Preferred urethane rubbers are those so-called "millable" urethanes such as MILLATHANE™ grades from TSI Industries.

Additional information on such urethane materials can be found in Golding, Polymers and Resins, Van Nostrande, 1959, pages 325 et seq. and Saunders and Frisch, Polyurethanes, Chemistry and Technology, Part II, Interscience Publishers, 1964, among others.

Additives

In various embodiments, a hydrocarbon oil can also be included in the polymeric blends. This additional component may reduce subsequent diffusion and absorption of undesirable low molecular weight species typically found in fiber optical cable grease, thereby improving the balance between impact performance and gel compatibility.

When employed, the hydrocarbon oil can be present in the polymeric blends in an amount ranging from 0.2 to 10 parts per hundred resin ("phr"), or from 0.3 to 3.0 phr based on 100 weight parts of all polymer components present in the polymeric blend. Higher molecular weight hydrocarbon oils are more preferable than low molecular weight hydrocarbon oils. In various embodiments, the hydrocarbon oil can have a viscosity greater than 400 centistokes as measured by ASTM D-445. Additionally, the hydrocarbon oil can have a specific gravity between 0.86 and 0.90 as measured by ASTM D-1250. Also, the hydrocarbon oil can have a flash point greater than 300° C. as measured by ASTM D-92. Furthermore, the hydrocarbon oil can have a pour point greater than −10° C. as measured by ASTM D-97. Moreover, the hydrocarbon oil can have an aniline point between 80 and 300° C. as measured by ASTM D-611.

In various embodiments, the polymeric blend can include one or more particulate fillers, such as glass fibers or various mineral fillers including nano-composites. Fillers, especially those with elongated or platelet-shaped particles providing a higher aspect ratio (length/thickness), may improve modulus and post extrusion shrinkage characteristics. Fillers may be included in the polymeric blend in an amount ranging from 0.1 to 20 phr based on 100 weight parts of all polymer components present in the polymeric blend.

The polymeric blends may also contain other types of additives. Representative additives include, but are not limited to, antioxidants, cross linking co-agents, cure boosters and scorch retardants, processing aids, coupling agents, ultraviolet stabilizers (including UV absorbers), antistatic agents, nucleating agents, slip agents, lubricants, viscosity control agents, tackifiers, anti-blocking agents, surfactants, extender oils, acid scavengers, flame retardants and metal deactivators. These additives are typically used in a conventional manner and in conventional amounts, e.g., from 0.01 phr or less to 20 phr or more based on 100 weight parts of all polymer components present in the polymeric blend.

Suitable UV light stabilizers include hindered amine light stabilizers ("HALS") and UV light absorber ("UVA") additives. Representative UVA additives include benzotriazole types such as Tinuvin 326 and Tinuvin 328 commercially available from Ciba, Inc. Blends of HAL's and UVA additives are also effective.

Examples of antioxidants include hindered phenols such as tetrakis[methylene(3,5-di-tert-butyl-4-hydroxyhydro-cinnamate)]methane; bis[(beta-(3,5-ditert-butyl-4-hydroxybenzyl)methylcarboxyethyl)]-sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)-hydrocinnamate; phosphites and phosphonites such as tris(2,4-di-tert-butylphenyl) phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl)diphenylamine, diphenyl-p-phenylenediamine, mixed di-aryl-p-phenylenediamines, and other hindered amine anti-degradants or stabilizers.

Examples of processing aids include but are not limited to metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non ionic surfactants; silicone fluids and polysiloxanes.

Compounding

In one or more embodiments, the components of the polymeric blend used in the practice of this invention can be added to a batch or continuous mixer for melt blending. The components can be added in any order or first preparing one or more masterbatches for blending with the other components. Additives are usually blended with one or more other components before being added to the bulk resins and/or filler. In one embodiment, the additives can be added directly to the compounding line without the use of previously prepared masterbatches. Typically, melt blending is conducted at a temperature above the highest melting polymer but lower than the activation temperature of peroxide (if one is present). The melt blended composition can then either be delivered to an extruder or an injection molding machine or passed through a die for shaping into the desired article, or converted to pellets, tape, strip or film or some other form for storage or to prepare the material for feeding to a next shaping or processing step. Optionally, if shaped into pellets or some similar configuration, then the pellets, etc. can be coated with an anti-block agent to facilitate handling while in storage.

Compounding of the compositions can be effected by standard equipment known to those skilled in the art. Examples of compounding equipment are internal batch mixers, such as a Banbury™ or Bolling™ internal mixer. Alternatively, continuous single, or twin screw, mixers can be used, such as Farrel™ continuous mixer, a Werner and Pfleiderer™ twin screw mixer, or a Buss™ kneading continuous extruder. The type of mixer utilized, and the operating conditions of the mixer, will affect properties of the composition such as viscosity, volume resistivity, and extruded surface smoothness.

Molded electrical articles comprising the polymeric blends of this invention can be made via an injection-molding process in which the compounded material is fed to the injection-molding machine to manufacture a molded part of a given design.

Optical Fiber Cable

In various embodiments, an optical fiber cable can be prepared that includes at least one extruded optical protective component made from the polymer blends described herein and incorporating at least one optical fiber transmission medium.

A cross-sectional view of a common loose buffer tube optical fiber cable design is shown in FIG. 1. In this design of optical fiber cable 1, buffer tubes 2 are positioned radially around a central strength member 4, with a helical rotation to the tubes in the axial length. The helical rotation allows bending of the cable without significantly stretching the tube or the optic fibers 6.

If a reduced number of buffer tubes is required, then foamed filler rods 10 can be used as low-cost spacers to occupy one or more buffer tube positions to maintain cable geometry. The cable jacket 14 is generally fabricated from a polyethylene-based material.

The buffer tubes are typically filled with an optic cable grease or gel. Various gel compounds are available commercially, a number of which are hydrocarbon-based greases incorporating hydrocarbon oils. Others are polymer based and use a low viscosity polymer formulated with hydrocarbon oils and other additives for even lower viscosity for ease of filling. These greases and gels provide the suspension and protection needed in the immediate environment surrounding the fibers, including eliminating air space. This filling compound (also referred to as "gel" or "grease") provides a barrier against water penetration, which is detrimental to the optic transmission performance.

In either oil-based grease or polymer formulated with oil for lower viscosity, the hydrocarbon oils are typically low-molecular-weight hydrocarbon oils, which can be absorbed into polymeric buffer tubes. Absorption typically adversely affects the tube's mechanical properties, such as flexural modulus and crush resistance. A decrease in crush resistance renders the optic fibers more prone to mechanical stress, thereby permitting an increase in signal attenuation and increasing the possibility of catastrophic failure. Thus, good retention of modulus and crush resistance along with minimal oil absorption, commonly referred to as "grease compatibility," are important performance characteristics for polymeric materials to be used for making extruded optical protective component.

Many other buffer tube cable designs are possible. The size and materials of construction for the central strength and tensile member, the dimensions and number of buffer tubes, and the use of metallic armors and multiple layers of jacketing material are among the design elements.

Figure 2:
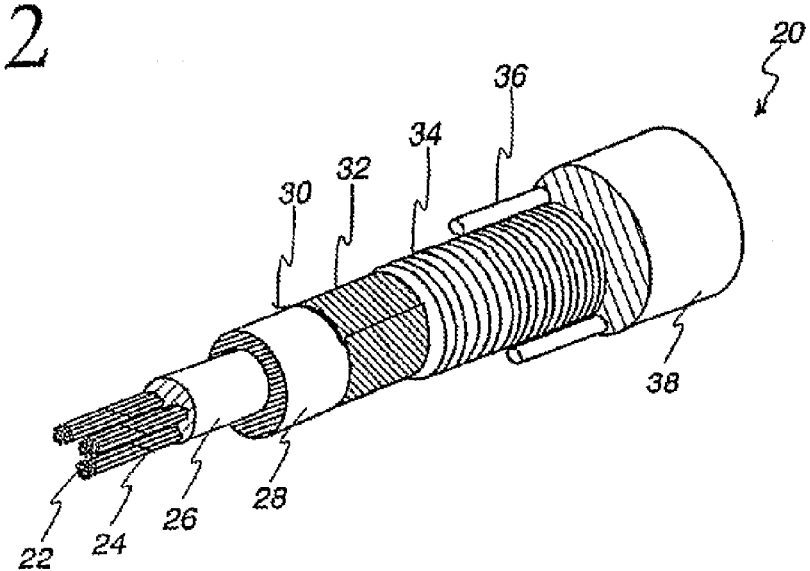
FIG. 2 shows a partial cutaway view of a core tube optical fiber cable.

A cross-sectional view of a typical core-tube optical fiber cable, also known as "central tube," is illustrated in FIG. 2.

Bundles 24 of the optical fibers 22 are positioned near the center of the optical cable 20 within a central, cylindrical core tube 28. The bundles are embedded in a filling material 26. Water blocking tape 32 surrounds the ripcords 30, which are on the surface of the core tube. A corrugated, coated steel cylinder 34 surrounds the tape to protect the bundles. Wire strength members 36 provide the cable with strength and stiffness. A jacket 38, which is generally fabricated from a polyethylene-based material, surrounds all of the components. In this design, the mechanical functions are incorporated into the outer sheathing system composed of the core tube, polyolefin jacketing layers, tensile and compressive strength members, metallic armors, core wraps, water blocking components, and other components.

The core tube is typically larger in diameter than a buffer tube to accommodate bundles of fibers or the use of ribbon components containing the optic fibers. Color-coded binders are typically used to bundle and identify the fibers. The core tube can contain water blocking grease or super-absorbent polymer elements surrounding the optic fiber components. The optimal material characteristics for the core tube component are often similar to those of the buffer tube application.

A cross-sectional view of a typical slotted-core cable design is shown in FIG. 3. The optical fiber cable 30 includes a jacket 48 and a slotted core 32, having a central member 34. The central member prevents buckling and controls axial shrinkage of the extruded slotted core profile shape. The jacket and the slotted core are typically made from a polyolefin-based material.

The slotted core has slots 36 in which optical fibers 38 are located. A filler rod 40 also may occupy one or more slots. A water-blocking layer 42, which may have one or more ripcords 44, surrounds the slotted core 32. A dielectric strength member layer 46 surrounds the water blocking layer.

An optical fiber cable, such as those described above, can typically be made in a series of sequential manufacturing steps. Optical transmission fibers are generally manufactured in the initial step. The fibers can have a polymeric coating for mechanical protection. These fibers can be assembled into bundles or ribbon cable configurations or can be directly incorporated into the cable fabrication.

Optical protective components can be manufactured using an extrusion fabrication process. Typically, a single screw plasticating extruder discharges a fluxed and mixed polymer under pressure into a wire and cable cross-head. The cross-head turns the melt flow perpendicular to the extruder and shapes the flow into the molten component. For buffer and core tubes, one or more optic fibers or fiber assemblies and grease are fed into the back of the cross-head and exit the cross-head within the molten tube that is then cooled and solidified in a water trough system. This component is eventually collected as a finished component on a take-up reel.

To fabricate components comprised of two or more material layers, there typically would be separate plasticating extruders feeding the melt compositions into a multi-layer cross-head where it is shaped into the desired multi-layer construction.

Slotted core members and other profile extrusion components would typically be extruded in a similar profile extrusion process incorporating an appropriate shaping die, and then subsequently combined with the optical fiber components to fabricate the finished cable.

To control excess fiber length, a tensioning system is used to feed the fiber components into the tube fabrication process. In addition, component materials selection, the tube extrusion and cross-head equipment, and processing conditions are optimized to provide a finished component where post extrusion shrinkage does not result in excessive slack in the optic fiber components.

The extruded optical protective components, along with other components such as central components, armors, wraps, are then subsequently processed in one or more steps to produce the finished cable construction. This typically includes processing on a cabling line where the components are assembled with a fabricating extruder/crosshead then used to apply the polymeric jacketing.

Test Methods

Brittleness Temperature
Determine brittleness temperature according to ASTM D746.
Density
Density is determined according to ASTM D792.
Flexural (Young's) Modulus
Determine flexural (Young's) modulus according to ASTM D790.
Flexural Stress @3.5% Strain
Determine flexural stress according to ASTM D790.
Izod Impact Strength
Determine notched Izod impact strength according to ASTM D256.
Melt Index
Melt index, or $I_2$, is measured in accordance by ASTM D1238, condition 190° C./2.16 kg, and is reported in grams eluted per 10 minutes.
Molecular Weight Distribution
The gel permeation chromatography ("GPC") system consists of a Polymer Char GPC-IR High Temperature Chromatograph, equipped with an IR4 infra-red detector from Polymer ChAR (Valencia, Spain). Data collection and processing is performed using Polymer Char software. The system is also equipped with an on-line solvent degassing device.

Suitable high temperature GPC columns can be used, such as four 30 cm long Shodex HT803 13 micron columns, or four 30 cm Polymer Labs columns of 13-micron mixed-pore-size packing (Olexis LS, Polymer Labs). The sample carousel compartment is operated at 140° C., and the column compartment is operated at 150° C. The samples are prepared at a concentration of 0.1 grams of polymer in 50 milliliters of solvent. The chromatographic solvent and the sample preparation solvent is 1,2,4-trichlorobenzene ("TCB") containing 200 ppm of 2,6-di-tert-butyl-4methylphenol ("BHT"). The solvent is sparged with nitrogen. The polymer samples are stirred at 160° C. for four hours. The injection volume is 200 microliters. The flow rate through the GPC is set at 1 mL/minute.

The GPC column set is calibrated by running 21 narrow molecular weight distribution polystyrene standards. The molecular weight ("MW") of the standards ranges from 580 g/mol to 8,400,000 g/mol, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to, or greater than, 1,000,000 g/mol, and at 0.05 g in 50 mL of solvent for molecular weights less than 1,000,000 g/mol. The polystyrene standards are dissolved at 80° C., with agitation, for 30 minutes. The narrow standards mixtures are run first, and in order of decreasing highest molecular weight component to minimize degradation. The polystyrene standard peak molecular weights are converted to polyethylene molecular weight using Equation (1) (as described in Williams and Ward, J. Polym. Sci., Polym. Letters, 6, 621 (1968)):

$$M\text{polyethylene} = A \times (M\text{polystyrene})B \quad \text{(Eq. 1)}$$

where M is the molecular weight of polyethylene or polystyrene (as marked), and B is equal to 1.0. It is known to those of ordinary skill in the art that A may be in a range of about 0.38 to about 0.44, and is determined at the time of calibration using a broad polyethylene standard, as discussed below. Use of this polyethylene calibration method to obtain molecular weight values, such as the molecular weight distribution (MWD or Mw/Mn), and related statistics, is defined here as the modified method of Williams and Ward. The number average molecular weight, the weight average molecular weight, and the z-average molecular weight are calculated from the following equations.

$$Mw_{CC} = \sum_i \left( \frac{C_i}{\sum_i C_i} \right) M_i = \sum_i w_i M_{cc,i} \quad \text{(Eq. 2)}$$

$$M_{n,cc} = \sum w_i / \sum (w_i / M_{cc,i}) \quad \text{(Eq. 3)}$$

$$M_{z,cc} = \sum (w_i M_{cc,i}^2) / \sum (w_i / M_{cc,i}) \quad \text{(Eq. 4)}$$

Tensile Modulus (Secant 1%)
Determine tensile modulus according to ASTM D638.
Tensile Strength
Determine tensile strength according to ASTM D638.
Tensile Elongation
Determine tensile elongation according to ASTM D638.
Weight Gain (Grease Resistance)
Determine weight gain according to Chinese standard method YD/T1118.1-2001.
1. Select 6 tensile bars (ASTM D638 Type I) and weigh the mass of each bar, denoted as $m_{fresh}$
2. Grease coating on the tensile bars
   a. Gel is first degassed in a vacuum oven at 80° C. to eliminate any bubbles or air pockets in the grease.
   b. The grease is coated on only one side of the test specimen carefully using the blade, and the grease thickness is less than 1 mm.
   c. The coated specimen is then put on a plate with the grease face turned upwards.
3. Aging in the oven: The plates with specimens are then put into the air-circulated oven for aging. The aging condition is 80° C. for 360 hrs, unless otherwise indicated.
4. Weigh the mass of tensile bars after aging: After the aging, the specimens are removed from oven, and are wiped up by tissue and allowed to cool down to room temperature and conditioned for 24 h before weighting. The mass of the aged tensile bars is denoted as $m_{aging}$, the weight gain was calculated according to equation below:

$$\text{Weight Gain (\%)} = \frac{m_{aging} - m_{fresh}}{m_{fresh}} * 100$$

Materials

The following materials are employed in the Examples, below.

The polybutylene terephthalate ("PBT") employed is Ultradur B6550 LN, having a density of 1.3 g/cm$^3$ and a melt volume-flow rate MVR of 9 cm$^3$/10 min at 250° C. and 2.16 kg, which is available from BASF Chemical Company SE, Ludwigshafen, Germany.

The crystalline polypropylene (1) employed is PP-SK-H238W, which has a crystallinity of 61.0%, a density of 0.905 g/cm$^3$, and a melt index of 3.0 g/10 min at 230° C./2.16 kg. PP-SK-H238W is commercially available from SK Global Chemical Corporation, Korea.

A second crystalline polypropylene (2) is Globalene PC366-5, which is also employed, has a crystallinity of 55.3%, a density of 0.903 g/cm$^3$, and a melt index of 5.5 g/10 min at 230° C./2.16 kg. PC366-5 is commercially available from LCY Chemical Corporation, Taipei, Taiwan.

The polyolefin elastomer is AFFINITY™ PL 1880G, which is an ethylene/octene olefin elastomer having a density of 0.902 g/cm$^3$ and a melt index of 1.0 g/10 min., and is available from The Dow Chemical Company, Midland, Mich., USA.

The olefin multi-block interpolymer is an ethylene/octene interpolymer and has a target density of 0.870 g/cm$^3$ and a target melt index of 0.5 g/10 min. The ethylene/octene multi-block interpolymer is prepared according to the procedure described in detail in U.S. Pat. No. 7,947,793 for Example numbers 24-28 and 29-40. The ethylene/octene multi-block interpolymer has the following properties:
Density: 0.873 g/cm$^3$
$I_2$: 0.57 g/10 min.
$I_{10}$: 6.06 g/10 min.
$I_{10}/I_2$: 10.63
Weight-average molecular weight ("Mw") (in g/mol): 148,600
Number-average molecular weight ("Mn") (in g/mol): 53,590
Polydispersity index ("Mw/Mn"): 2.77
Heat of fusion (in J/g): 38.23
Melting temperature ("$T_m$"): 118.4° C.
Crystallization temperature ("$T_c$"): 92.0° C.
Overall octene content (in mol %): 18.9
Octene content in Soft Segment (in mol %): 27.1
Octene content in Hard Segment (in mol %): 1.4
ΔOctene: 25.7
DHT-4A is an acid scavenger having a chemical formula of:

$$Mg_{1-x}Al_x(OH)_2(CO_3)_{x/2} \cdot mH_2O \ (0 < x \leq 5)$$

and is described as a magnesium aluminum hydroxide carbonate hydrate. HDT-4A is commercially available from Kisuma Chemicals B.V., The Netherlands.

NA-11A is a nucleating agent with the chemical name sodium 2, 2'-methylene-bis-(4,6-di-tert-butylphenyl)phosphate (CAS NO. 85209-91-2), which is commercially available from ADEKA Corporation, Tokyo, Japan.

IRGANOX™ 1010 is an antioxidant with the chemical name pentaerythritol tetrakis(3-(3,5-di-tert-butyl-4-hydroxyphenyl)propionate), which is commercially available from BASF SE, Ludwigshafen, Germany.

IRGANOX™ 168 is an antioxidant with the chemical name tris(2,4-ditert-butylphenyl)phosphite, which is commercially available from BASF SE, Ludwigshafen, Germany.

The BC B is an isotactic-polypropylene/ethylene-propylene olefin block composite having a density of 0.905 g/cm$^3$ and a melt index of 6 at 230° C.

The BC H is an isotactic-polypropylene/ethylene-propylene olefin block composite having a density of 0.873 g/cm$^3$ and a melt index of 6 at 230° C.

Each of the two olefin block composites is prepared according to the following procedure. Catalyst-1 ([[rel-2′,2′′′-[(1R,2R)-1,2-cylcohexanediylbis(methyleneoxy-κO)]bis[3-(9H-carbazol-9-yl)-5-methyl[1,1′-biphenyl]-2-olato-κO]](2-)]dimethyl-hafnium) and cocatalyst-1, a mixture of methyldi($C_{14-18}$ alkyl)ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,983, Ex. 2., are purchased from Boulder Scientific and used without further purification.

CSA-1 (diethylzinc or DEZ) and cocatalyst-2 (modified methylalumoxane ("MMAO")) are purchased from Akzo Nobel and used without further purification. The solvent for the polymerization reactions is a hydrocarbon mixture (ISOPAR® E) obtainable from ExxonMobil Chemical Company and purified through beds of 13-X molecular sieves prior to use.

The block composites are prepared using two continuous stirred tank reactors ("CSTR") connected in series. The first reactor is approximately 12 gallons in volume while the second reactor is approximately 26 gallons. Each reactor is hydraulically full and set to operate at steady state conditions. Monomers, solvent, hydrogen, catalyst-1, cocatalyst-1, cocatalyst-2 and CSA-1 are fed to the first reactor according to the process conditions outlined in Table 1. The first reactor contents as described in Table 1 flow to a second reactor in series. Additional monomers, solvent, hydrogen, catalyst-1, cocatalyst-1, and optionally, cocatalyst-2, are added to the second reactor.

TABLE 1

Block Composite Process Conditions

| Condition | BC B | | BC H | |
|---|---|---|---|---|
| | 1$^{st}$ Reactor | 2$^{nd}$ Reactor | 1$^{st}$ Reactor | 2$^{nd}$ Reactor |
| Reactor Control Temp. (° C.) | 140 | 135 | 96 | 109 |
| Solvent Feed (lb/hr) | 242 | 245 | 145 | 145 |
| Propylene Feed (lb/hr) | 5.5 | 49.3 | 19 | 29 |
| Ethylene Feed (lb/hr) | 47.1 | — | 12 | — |
| Reactor Propylene Conc. (g/L) | 2.0 | 2.0 | 2.17 | 2.07 |
| Hydrogen Feed (SCCM) | 9.6 | 9.9 | 10 | 11 |
| Catalyst Efficiency (gPoly/gM) * 10$^6$ | 0.86 | 0.03 | 5.42 | 0.15 |
| Catalyst Flow (lb/hr) | 1.96 | 2.14 | 0.38 | 1.02 |
| Catalyst Conc. (ppm) | 29.9 | 900 | 15 | 196 |
| Cocatalyst-1 Flow (lb/hr) | 1.47 | 2.16 | 0.38 | 1.99 |
| Cocatalyst-1 Conc. (ppm) | 399 | 7500 | 199 | 1000 |
| Cocat.-2 Flow (lb/hr) | — | 0.3 | 0.61 | — |
| Cocat.-2 Conc. (ppm) | — | 2686 | 1494 | — |
| DEZ Flow (lb/hr) | 0.64 | — | 0.72 | — |
| DEZ Concentration (ppm) | 3599 | — | 29989 | — |

The block composites prepared as described above have the following properties shown in Table 2:

TABLE 2

Block Composite Properties

| Property | BC B | BC H |
|---|---|---|
| Melt Flow Rate ("MFR") (230° C./2.16 Kg) | 7.0 | 6.0 |
| Molecular Weight (Mw) (Kg/mol) | 128 | 185 |
| Polydispersity Index (Mw/Mn) | 4.0 | 3.0 |
| Total Weight Percent $C_2$ | 46.9 | 20.5 |
| Melting Temperature (° C.) Peak 1 | 132 | 138 |
| Crystallization Temperature (° C.) | 91 | 96 |
| Melt Enthalpy (J/g) | 97 | 57 |
| Wt % iPP | 50 | 50 |
| Wt % EP | 50 | 50 |
| Wt % $C_2$ in EP | 90 | 40 |
| Block Composite Index | 0.707 | 0.368 |

EXAMPLES

Example 1 (Comparative)

Prepare three comparative samples [CS1-CS3] using the formulations provided in Table 3, below. The PBT in CS 1 is employed as received. All samples are prepared by blending and extruding the components on an 18-mm, 48 L/D twin screw extruder operated at 500 rpm and 10 kg/hr throughput rate, and a temperature profile starting from the feeder barrel to the die as follows: 90° C./120° C./200° C./200° C./200° C./200° C./200° C.

TABLE 3

Compositions of CS1-CS3

| Component: | CS1 | CS2 | CS3 |
|---|---|---|---|
| PBT (wt %) | 100 | — | — |
| Polypropylene (1) (wt %) | — | 99.335 | 87.335 |
| AFFINITY ™ PL 1880G (wt %) | — | — | 12 |
| DHT-4A (wt %) | — | 0.025 | 0.025 |
| NA-11A (wt %) | — | 0.14 | 0.14 |
| IRGANOX ™ 1010 (wt %) | — | 0.4 | 0.4 |
| IRGANOX ™ 168 (wt %) | — | 0.1 | 0.1 |

Analyze Comparative Samples CS1-CS3 according to the Test Methods described above. Results are provided in Table 4, below.

TABLE 4

Properties of CS1-CS3

| Property: | CS1 | CS2 | CS3 |
|---|---|---|---|
| Impact Strength, 23° C. (J/m) | 49.8 | 67.6 | 77.3 |
| Impact Strength, −23° C. (J/m) | 44.6 | 15.3 | 21.3 |
| Brittleness Temperature (° C.) | 12.5 | 17.5 | >15 |
| Tensile modulus, Secant 1% (MPa) | 3005 | 1522 | 1362 |
| Flexural (Young's) Modulus (MPa) | 2582 | 1346 | 1411 |
| Flexural Stress @ 3.5% strain (MPa) | 75.7 | 33.5 | 35.3 |
| Tensile Strength @ Yield (MPa) | 55.9 | 38.4 | 31.7 |
| Tensile Elongation @ Yield (%) | 3.551 | 9.65 | 10.7 |
| Heat Deflection Temp @ 0.45 MPa (° C.) | 148 | 112 | 99.1 |
| Weight gain in LT-410A (%) | −0.31* | 4.98 | 6.25 |
| Weight gain in LT-390PP (%) | −0.01* | 2.36 | 2.42 |
| TS after 16 days in LT-390PP (MPa) | 60.6 | — | 28.0 |
| TE @ Yield after 16 days in LT-390PP (%) | 11.0 | — | 25.3 |

*30 days aging

Example 2

Prepare four Samples (S1-S4) using the formulations shown in Table 5, below. Samples S1-S4 are prepared according to the following procedure. Samples S1-S4 are prepared on an 18-mm, 48 L/D twin screw extruder operated at 500 rpm and 10 kg/hr throughput rate, and a temperature profile starting from the feeder barrel to the die as follows: 90° C./120° C./200° C./200° C./200° C./200° C./200° C.

TABLE 5

Compositions of S1-S4

| Component: | S1 | S2 | S3 | S4 |
|---|---|---|---|---|
| Polypropylene (2) (wt %) | 95.335 | 89.335 | 69.335 | 49.335 |
| BC H (wt %) | 4 | 10 | 30 | 50 |
| DHT-4A (wt %) | 0.025 | 0.025 | 0.025 | 0.025 |
| NA-11A (wt %) | 0.14 | 0.14 | 0.14 | 0.14 |
| IRGANOX ™ 1010 (wt %) | 0.4 | 0.4 | 0.4 | 0.4 |
| IRGANOX ™ 168 (wt %) | 0.1 | 0.1 | 0.1 | 0.1 |

Analyze Samples S1-S4 according to the Test Methods described above. Results are provided in Table 6, below.

TABLE 6

Properties of S1-S4

| Property: | S1 | S2 | S3 | S4 |
|---|---|---|---|---|
| Impact Strength, 23° C. (J/m) | 21.08 | 25.28 | 325.22 | 527.21 |
| Impact Strength, −23° C. (J/m) | 17.17 | 17.69 | 18.83 | 328.79 |
| Brittleness Temperature (° C.) | >10 | −2 | −17 | <−30 |
| Tensile modulus, Secant 1% (MPa) | 1888 | 1722 | 1278 | 933 |
| Flexural (Young's) Modulus (MPa) | 1990 | 1769 | 1354 | 893 |
| Flexural Stress @ 3.5% strain (MPa) | 51.0 | 45.7 | 33.9 | 21.8 |
| Tensile Strength ("TS") @ Yield (MPa) | 39.9 | 38.7 | 29.8 | 21.7 |
| Tensile Elongation ("TE") @ Yield (%) | 6.4 | 8.1 | 10.4 | 21.3 |
| Heat Deflection Temp @ 0.45 MPa (° C.) | 137.8 | 136.4 | 123.8 | 105.7 |
| Weight Gain in LT-390PP (%) | 1.72 | 2.01 | 4.10 | 9.72 |
| TS after 16 days in LT-390PP (MPa) | 39.3 | 37.7 | 29.2 | 19.5 |
| TE @ Yield after 16 days in LT-390PP (%) | 7.8 | 9.7 | 26.3 | 48.6 |

As can be seen from the results in Table 6, addition of an olefin block composite increases the impact strength of the polypropylene while decreasing the brittleness temperature, particularly in comparison to a polypropylene modified with a polyolefin elastomer alone (cf. Comparative Sample CS3). In addition and as shown by the data of Samples S1-S4, compared to Comparative Sample CS1 and particularly CS3, with judicious loading of the olefin multi-block interpolymer, it is possible to produce a compound with improved impact properties and good balance of tensile modulus, tensile strength and grease resistance.

Example 3

Prepare four Samples (S5-S8) using the formulations shown in Table 7, below. Samples S5-S8 are prepared according to the procedure described in Example 2, above.

TABLE 7

Compositions of S5-S8

| Component: | S5 | S6 | S7 | S8 |
|---|---|---|---|---|
| Polypropylene (2) (wt %) | 95.335 | 89.335 | 69.335 | 49.335 |
| Olefin multi-block interpolymer (wt %) | 4 | 10 | 30 | 50 |
| DHT-4A (wt %) | 0.025 | 0.025 | 0.025 | 0.025 |
| NA-11A (wt %) | 0.14 | 0.14 | 0.14 | 0.14 |
| IRGANOX ™ 1010 (wt %) | 0.4 | 0.4 | 0.4 | 0.4 |
| IRGANOX ™ 168 (wt %) | 0.1 | 0.1 | 0.1 | 0.1 |

Analyze Samples S5-S8 according to the Test Methods described above. Results are provided in Table 8, below.

TABLE 8

Properties of S5-S8

| Property: | S5 | S6 | S7 | S8 |
|---|---|---|---|---|
| Impact Strength, 23° C. (J/m) | 54.4 | 83.05 | 709.39 | 637.99 |
| Impact Strength, −23° C. (J/m) | 17.47 | 24.35 | 574 | 868.21 |
| Brittleness Temperature (° C.) | >10 | −2 | <−30 | <−30 |
| Tensile modulus, Secant 1% (MPa) | 1892 | 1634 | 1177 | 665 |
| Flexural (Young's) Modulus (MPa) | 1942 | 1764 | 1094 | 586 |
| Flexural Stress @ 3.5% strain (MPa) | 48.4 | 43.4 | 25.3 | 13.3 |
| Tensile Strength ("TS") @ Yield (MPa) | 39.3 | 34.7 | 24.1 | 17.0 |
| Tensile Elongation ("TE") @ Yield (%) | 5.2 | 6.6 | 8.4 | 39.7 |
| Heat Deflection Temp @ 0.45 MPa (° C.) | 139.8 | 130.6 | 106.4 | 82.3 |
| Weight Gain in LT-390PP (%) | 1.32 | 1.89 | 7.01 | 21.4 |
| TS after 16 days in LT-390PP (MPa) | 37.5 | 34.2 | 23.4 | 13.7 |
| TE @ Yield after 16 days in LT-390PP (%) | 6.0 | 13.3 | 41.2 | 145.8 |

As can be seen from the results in Table 8, addition of an olefin multi-block interpolymer increases the impact strength of the polypropylene while decreasing the brittleness temperature, particularly in comparison to a polypropylene modified with a polyolefin elastomer alone (cf. Comparative Sample CS3). Similar to previous Samples and as shown by the data of Samples S5-S8, compared to Comparative Sample CS1 and particularly CS3, with judicious loading of the olefin multi-block interpolymer, it is possible to produce a compound with improved impact properties and good balance of tensile modulus, tensile strength and grease resistance.

Example 4

Prepare four Samples (S9-S12) using the formulations shown in Table 9, below. Samples S9-S12 are prepared according to the procedure described in Example 2, above.

TABLE 9

Compositions of S9-S12

| Component: | S9 | S10 | S11 | S12 |
|---|---|---|---|---|
| Polypropylene (1) (wt %) | — | 83.335 | 83.335 | — |
| Polypropylene (2) (wt %) | 85.335 | — | — | 65.335 |
| Olefin multi-block interpolymer (wt %) | 10 | 12 | 12 | 30 |
| BC B (wt %) | — | 4 | — | — |
| BC H (wt %) | 4 | — | 4 | 4 |
| DHT-4A (wt %) | 0.025 | 0.025 | 0.025 | 0.025 |
| NA-11A (wt %) | 0.14 | 0.14 | 0.14 | 0.14 |

TABLE 9-continued

Compositions of S9-S12

| Component: | S9 | S10 | S11 | S12 |
|---|---|---|---|---|
| IRGANOX ™ 1010 (wt %) | 0.4 | 0.4 | 0.4 | 0.4 |
| IRGANOX ™ 168 (wt %) | 0.1 | 0.1 | 0.1 | 0.1 |

Analyze Samples S9-S12 according to the Test Methods described above. Results are provided in Table 10, below.

TABLE 10

Properties of S9-S12

| Property: | S9 | S10 | S11 | S12 |
|---|---|---|---|---|
| Impact Strength, 23° C. (J/m) | 394.13 | 188.3 | 532.8 | 664.53 |
| Impact Strength, −23° C. (J/m) | 42.41 | 36.8 | 35.6 | 670.85 |
| Brittleness Temperature (° C.) | −12 | −10 | <−10 | <−30 |
| Tensile modulus, Secant 1% (MPa) | 1634 | 1237 | 1270 | 1117 |
| Flexural (Young's) Modulus (MPa) | 1560 | 1244 | 1281 | 967 |
| Flexural Stress @ 3.5% strain (MPa) | 37.9 | 30.8 | 31.0 | 23.0 |
| Tensile Strength ("TS") @ Yield (MPa) | 31.6 | 28.3 | 28.9 | 23.9 |
| Tensile Elongation ("TE") @ Yield (%) | 4.2 | 11.6 | 11.7 | 12.7 |
| Heat Deflection Temp @ 0.45 MPa (° C.) | 124.9 | 94.5 | 96.1 | 108.3 |
| Weight Gain in LT-410A (%) | — | 8.61 | 8.94 | — |
| Weight Gain in LT-390PP (%) | 5.56 | — | 3.55 | 8.11 |
| TS after 16 days in LT-390PP (MPa) | 29.9 | 24.3 | 23.3 | 21.2 |
| TE @ Yield after 16 days in LT-390PP (%) | 32.0 | 33.0 | 39.1 | 49.7 |

As can be seen from the results in Table 10, addition of both an olefin block composite and an olefin multi-block interpolymer increases the impact strength of the polypropylene while decreasing the brittleness temperature, particularly in comparison to a polypropylene modified with a polyolefin elastomer alone (cf. Comparative Sample CS3). In the data of Samples S9-S12, compared to Comparative Samples CS1 and particularly CS3, it is shown that with judicious loading and combination of an olefin multi-block interpolymer and a di-block composite, it is possible to further improve the impact properties and also produce a compound exhibiting a good balance of tensile modulus and tensile strength amongst other properties.

Example 5

Prepare two Samples (S13 and S14) using the formulations shown in Table 11, below. Samples S13 and S14 are prepared according to the procedure described in Example 2, above.

TABLE 11

Compositions of S13 and S14

| Component: | S13 | S14 |
|---|---|---|
| Polypropylene (1) (wt %) | 83.335 | 83.335 |
| AFFINITY ™ PL 1880G (wt %) | 12 | 12 |
| BC B (wt %) | 4 | — |
| BC H (wt %) | — | 4 |
| DHT-4A (wt %) | 0.025 | 0.025 |
| NA-11A (wt %) | 0.14 | 0.14 |
| IRGANOX ™ 1010 (wt %) | 0.4 | 0.4 |
| IRGANOX ™ 168 (wt %) | 0.1 | 0.1 |

Analyze Samples S13 and S14 according to the Test Methods described above. Results are provided in Table 12, below.

TABLE 12

Properties of S11 and S12

| Property: | S11 | S12 |
|---|---|---|
| Impact Strength, 23° C. (J/m) | 166.7 | 356 |
| Impact Strength, −23° C. (J/m) | 21.8 | 20.6 |
| Brittleness Temperature (° C.) | 5 | 0 |
| Tensile modulus, Secant 1% (MPa) | 1324 | 1442 |
| Flexural (Young's) Modulus (MPa) | 1282 | 1321 |
| Flexural Stress @ 3.5% strain (MPa) | 32.5 | 32.8 |
| Tensile Strength ("TS") @ Yield (MPa) | 30.5 | 30.8 |
| Tensile Elongation ("TE") @ Yield (%) | 11.2 | 12.2 |
| Heat Deflection Temp @ 0.45 MPa (° C.) | 97.6 | 95.9 |
| Weight Gain in LT-410A (%) | 6.30 | 6.61 |
| Weight Gain in LT-390PP (%) | — | 2.88 |
| TS after 16 days in LT-390PP (MPa) | 27.4 | 26.3 |
| TE @ Yield after 16 days in LT-390PP (%) | 26.1 | 27.9 |

As can be seen from the results in Table 12, addition of both a polyolefin elastomer and an olefin block composite increases the impact strength of the polypropylene while decreasing the brittleness temperature, particularly in comparison to a polypropylene modified with a polyolefin elastomer alone (cf. Comparative Sample CS3) while maintaining a good balance of mechanical properties such as tensile modulus and tensile strength.

The invention claimed is:

1. An extruded optical cable protective component comprising an extruded polymeric blend, said extruded polymeric blend comprising:
    (a) a crystalline polypropylene having a crystallinity of at least about 55 percent; and
    (b) an impact-modifying polymer selected from the group consisting of an olefin multi-block interpolymer, an olefin block composite, and combinations thereof.

2. The extruded optical cable protective component of claim 1, wherein said crystalline polypropylene is present in an amount ranging from 50 to 95 weight percent based on the entire polymeric blend weight; wherein said impact-modifying polymer is present in an amount ranging from 4 to 50 weight percent based on the entire polymeric blend weight.

3. The extruded optical cable protective component of claim 1, further comprising (c) an elastomer other than said impact-modifying polymer.

4. The extruded optical cable protective component of claim 3, wherein said elastomer is a polyolefin elastomer.

5. The extruded optical cable protective component of claim 1, wherein said polypropylene has a melt flow index ($I_2$) in the range of from 1 to 20 grams eluted per 10 minutes.

6. The extruded optical cable protective component of claim 1, wherein said polymeric blend has a notched Izod impact strength at 23° C. of at least 100 Joule per meter ("J/m"); wherein said polymeric blend has a 1-percent secant modulus at 23° C. of at least 1,200 megapascals ("MPa").

7. The extruded optical cable protective component of claim 1, wherein said olefin multi-block interpolymer is an ethylene/octene multi-block copolymer; wherein said olefin block composite comprises diblock copolymers having hard polypropylene segments and soft ethylene-propylene segments.

8. The extruded optical cable protective component of claim 7, wherein said ethylene/octene multi-block copolymer is characterized by a molecular weight distribution, $M_w/M_n$, in the range of from 1.4 to 2.8, an average block index greater than zero and up to 1.0, and a difference in mole percent octene content between the soft segment and the hard segment of greater than 18.5 mole percent; wherein said ethylene/octene multi-block copolymer is mesophase separated.

9. The extruded optical cable protective component of claim 1, further comprising one or more additional components selected from the group consisting of antioxidants, stabilizers, nucleating agents, acid scavengers, fillers, and combinations of two or more thereof.

10. An optical fiber cable, comprising:
(a) the extruded optical fiber cable protective component of claim 1; and
(b) at least one optical fiber transmission medium.

* * * * *